United States Patent
Mittal et al.

(10) Patent No.: US 6,535,913 B2
(45) Date of Patent: Mar. 18, 2003

(54) METHOD AND APPARATUS FOR USE OF AN APPLICATION STATE STORAGE SYSTEM IN INTERACTING WITH ON-LINE SERVICES

(75) Inventors: Sanjay Mittal, Fremont, CA (US); Puneet Kumar Gupta, Santa Clara, CA (US)

(73) Assignee: Selectica, Inc., San Jose, CA (US)

( * ) Notice: Subject to any disclaimer, the term of this patent is extended or adjusted under 35 U.S.C. 154(b) by 0 days.

(21) Appl. No.: 09/811,249

(22) Filed: Mar. 16, 2001

(65) Prior Publication Data

US 2001/0027483 A1 Oct. 4, 2001

Related U.S. Application Data

(63) Continuation-in-part of application No. 09/199,136, filed on Nov. 24, 1998, now Pat. No. 6,233,609, which is a continuation-in-part of application No. 08/962,594, filed on Oct. 31, 1997, now Pat. No. 6,049,822.

(51) Int. Cl.[7] .............................................. G06F 13/00
(52) U.S. Cl. ........................ 709/219; 709/203; 709/328; 707/10
(58) Field of Search .................................. 709/203, 217, 709/219, 223, 225, 328, 329; 705/26, 27, 28, 29; 707/10, 100, 104

(56) References Cited

U.S. PATENT DOCUMENTS

| | | | | |
|---|---|---|---|---|
| 5,710,887 A | * | 1/1998 | Chelliah et al. | 705/26 |
| 5,870,771 A | * | 2/1999 | Oberg | 707/502 |
| 5,905,248 A | * | 5/1999 | Russell et al. | 235/462.27 |
| 5,920,696 A | * | 7/1999 | Brandt et al. | 709/218 |
| 5,970,472 A | * | 10/1999 | Allsop et al. | 705/26 |
| 6,061,057 A | * | 5/2000 | Knowlton et al. | 345/335 |
| 6,167,383 A | | 12/2000 | Henson | |
| 6,167,441 A | * | 12/2000 | Himmel | 709/217 |
| 6,266,666 B1 | * | 7/2001 | Ireland et al. | 707/10 |
| 6,308,205 B1 | * | 10/2001 | Carcerano et al. | 709/221 |
| 6,453,306 B1 | * | 9/2002 | Quelene | 705/80 |

* cited by examiner

Primary Examiner—Viet D. Vu
(74) Attorney, Agent, or Firm—Donald R. Boys; Central Coast Patent Agency, Inc.

(57) ABSTRACT

A change and update system for network-based knowledge-base (KB) sales and service facilities has a user interface (UI) system for accessing the facility over the network, software at the facility for negotiating with the user interface, and a state component at the facility storing state data for a configured order or service at the facility, the state data including a summary of the order or service and information regarding allowable alterations and effects of alterations. A user communicates through the user interface with the software at the facility, which negotiates changes to an existing order or service configuration using data from the state component, and the software, as a result of the negotiation, updates the configured order or service configuration with the negotiated changes.

21 Claims, 6 Drawing Sheets

METHOD AND APPARATUS FOR USE OF AN APPLICATION STATE STORAGE SYSTEM IN INTERACTING WITH ON-LINE SERVICES

CROSS-REFERENCE TO RELATED DOCUMENTS

The present invention is a continuation in part (CIP) to a patent application Ser. No. 09/199,136 filed Nov. 24, 1998, entitled Method and Apparatus for Remote Interaction With and Configuration of a WAN-based Knowledge Base, now U.S. Pat. No. 6,233,609 which is a continuation in part (CIP) of co-pending application Ser. No. 08/962,594 filed Oct. 31, 1997, entitled Method for Generating and Updating Knowledge-Based Configurators that are Multi Platform and Multi Language Capable, now U.S. Pat. No. 6,049,822. The prior applications are incorporated herein in their entirety by reference.

FIELD OF THE INVENTION

The present invention is in the field of client interaction with WEB-based sales and service systems, and pertains in particular to accomplishing efficient interaction with low-bandwidth devices.

BACKGROUND OF THE INVENTION

Computer-aided sales presentations wherein rules-based configurators are employed have long been a valuable tool for allowing a customer or client to configure his or her own order of a product or products. This technique is employed in a network environment whereby a client configures his or her order and sends it over the Internet, or another type of network, to a seller, which can fill the order. For example, a complex computer system has many different features, accessories, options, etc. With the appropriate software program, a client can configure his or her own custom order for a particular brand or type of system. By employing an interactive method a client can apply certain desired features in his product-order configuration that were chosen from options provided by a seller.

More recently, it is known to the inventor that object-oriented, constraint-based configurators have begun to replace rules-based configurators by virtue of their more flexible organization. For example, rules-based configurators rely on set rules that are programmed in a procedural computer language. Partly for this reason, every change in the merchandise offered may require substantial changes in the software, which can be quite a lot of work, considering the fast pace of trade today.

Rules-based configurators are not physically separated from the actual knowledge data and the application for manipulating the knowledge data. Knowledge base configurators known to the inventor have such separation (an applet) therefore, the knowledge base can be changed easily via an editing process. The knowledge base applies the changes via linking to other elements of the process such as the object model.

Generally speaking, an object model representing a product, such as a new automobile, is created using a programming language within a model building application at the sellers end. This object model contains all of the descriptive elements and various features including cost information about the object it represents. A model writer procedure then writes a binary file, which is readable only to applications written in the same environment.

These object models can then be presented to a client having the appropriate software application on the correct platform and using the required language. The client can then enter his desired choices or options via interactive software. A configurator commonly known as a run-time engine insures that the client's choices are applied correctly. The configurator is also adapted to negate any conflict or impossibility that may arise from the client's directives.

A difficulty with the current state of the art, which has hampered fast deployment of knowledge bases severely, is that although a knowledge base is superior to a rules base as described above, the knowledge base is language-dependent and not easily transferred across different platforms (i.e. IBM to Macintosh, or even Win 3.1 vs. Win 95). For example, a client would be required to operate in the same computer platform and language to be able to interactively configure his desired purchase. This is a serious problem because it severely limits the targeted on-line community that a seller may reach.

A knowledge base configuration process known to the inventor and described with reference to the priority application Ser. No. 08/962,594, U.S. Pat. No. 6,049,822, listed under the Cross-Reference to related documents section above, effectively solves the above described problem related to language and platform dependency. However, clients interacting with model-presenting companies must download both the knowledge base and the knowledge base configuration software in order to configure a product to hopefully reflect the desired specifications and features, which are offered.

According to an enhancement to the above method, the knowledge base and the knowledge base configurator both execute on a network-connected server hosted by the enterprise offering products and/or services. A GUI user interface application is downloaded from the server to any platform used by a client wishing to purchase products or services. Having downloaded the user interface, the client can manipulate the network-hosted configurator over a data link between the client's station and the server to configure the knowledge base to define products and/or services to be ordered. A preferred implementation of the above-described enhancement is with the server as an enterprise-hosted server connected to the Internet, and clients as users connected typically through Internet Service Providers to the Internet.

In operation of the system configurations discussed so far, a customer may access a web site and be served an interface for configuring an order for a product or service using, typically, a desktop computer having access to the WAN. A good example of this capability is exemplified with an online car dealership that allows customers to place an order for a new car and configure all of the custom options available with a particular car. When a customer accesses such an interface he or she must provide all of the information for ordering the car, including selection of options from possibilities presented within the interface. An interface that is complicated and has many possible selection options can comprise many pages of graphical interface. Such pages may include pictures of what the car looks like with and without the selected options and so on.

A user operating from a desktop computer that is relatively powerful may find such an experience comfortable and graphically entertaining, having access to technologies of surround video, audio cues and so on to aid the user in making selections. A problem with such systems that is not answered by the methods and apparatus thus far described, is that once an order is submitted it is not easily modified. This is partly because the order is configured using knowledgebase rules and constraints, which may contain many interrelationships among the available order options.

Typically, if a customer decides that he or she wishes to change one or two aspects of an order after submitting an original order, he or she must essentially re-order the product using the interface from scratch. The entire new order will replace the entire old order; the new order requiring almost as much work in terms of input and mouse clicks as was done for the old order.

With the advent of standalone Internet-capable appliances, known in the art as light or thin clients, and supporting software conventions, it has become possible to perform many WEB-based operations heretofore only possible from a relatively more powerful desktop computer. With such a device one might access a scaled-down (low-bandwidth) version of a functional Web page for example. Accomplishing changes to previously configured knowledge-based orders, however, typically requires the relatively powerful desktop computer and a complete re-order configuration as previously described.

What is clearly needed is a method and system enabling quick and efficient interaction with on-line sales and service systems from light clients such as cellular phones and hand-held computers.

SUMMARY OF THE INVENTION

In a preferred embodiment of the present invention a change and update system for network-based knowledgebase (KB) sales and service facilities is provided, comprising a user interface (UI) system for accessing the facility over the network, software at the facility for negotiating with the user interface, and a state component at the facility storing state data for a configured order or service at the facility, the state data including a summary of the order or service and information regarding allowable alterations and effects of alterations. A user communicates through the user interface with the software at the facility, which negotiates changes to an existing order or service configuration using data from the state component, and the software, as a result of the negotiation, updates the configured order or service configuration with the negotiated changes.

In a preferred embodiment the network is the Internet network. Also in a preferred embodiment the user interface operates on a light client and the software at the facility comprises an application interface (AI) enabled to recognize the light client, and to transmit selectable options to the user interface based on the characteristics of the light client. The light client may be one of a hand-held computer, a telephone device, or a personal digital assistant (PDA).

In a preferred embodiment, upon access by a light client, the software at the facility determines if the client has a usable UI, and if not, transmits UI software to the client prior to the negotiation. In some cases the facility is dedicated to product sales, and in some cases to one or more services.

IN another aspect of the invention a software suite for network-based knowledgebase (KB) sales and service facilities is provided, comprising a first component storing at least a summary of an original configuration for a product or service, and a second component for interfacing with a client device. The second component negotiates with the first component using input from the client device to effect a change in the configuration.

In a preferred embodiment the network is the Internet network. In some embodiments there is a third component for using the negotiated change to update the configuration. Also in some cases the client device is a light client and the second component comprises a facility for recognizing the client and communicating information to the client based on characteristics of the client.

Also in some embodiments the light client is one of a hand-held computer, a telephone device, or a personal digital assistant (PDA), and the second component provides compatible information for the particular device. In some preferred embodiments, upon access by a light client, the second component determines if the client has a usable UI, and if not, transmits UI software to the client prior to the negotiation. The software can be dedicated to either of configuration and change or service configuration and change, or to both. In some case the second component additionally stores information regarding allowable alterations and effects of alterations, and the additional information is used in negotiating changes.

In yet another aspect a method for effecting changes and updates for product and service configurations at a network-based knowledgebase (KB) sales and service facility is provided, comprising the steps of (a) storing at least a summary of a configuration separate from the configuration, in a state storage component, (b) communicating with a client device for update data to effect a change in a configuration, and (c) negotiating the change with the state storage facility. The network in preferred embodiments is Internet network. In some embodiments the client device is a light client and in step (b) the nature of the light client is determined, and the communication with the light client is conducted to be compatible with characteristics of the light client. The light client may be one of a hand-held computer, a telephone device, or a personal digital assistant (PDA).

In some cases, upon access by a light client, the software at the facility determines if the client has a usable user interface software (UI), and if not, transmits UI software to the client prior to negotiation.

DESCRIPTION OF THE PREFERRED EMBODIMENTS

Figure 1:
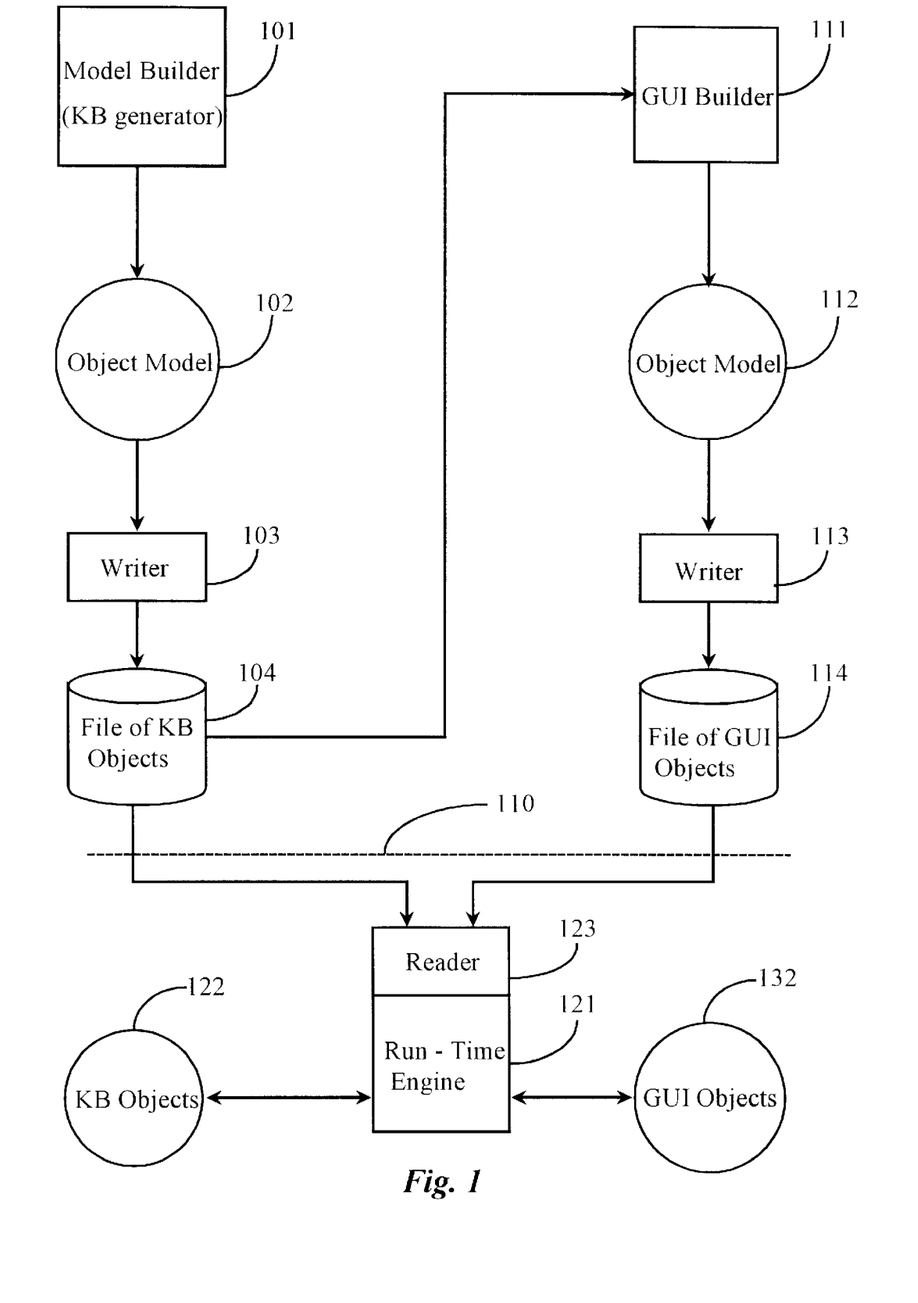
FIG. 1 is a flow chart illustrating a procedure for a knowledge base application according to an embodiment of the present invention.

FIG. 1 is a flow chart illustrating a knowledge base work flow application according to an embodiment of the present invention wherein both knowledge base objects and GUI objects are generated and presented to a client by an advertiser or seller of a product.

A knowledge base generator or model builder 101 is used at the sellers end to create a desired object model 102. As described briefly with reference to the background section, object model 102 contains all of the information related to the represented object or product such as dimensions, colors, styles, pricing and the like. Model builder 101 is a software tool known to the inventor in the art of generating knowledge bases.

In a preferred embodiment of the present invention a programming language such as Java or C+ is used in the building of object model 102. The reason for this is because these languages are relatively universal and usable among different platforms. It will be apparent to one with skill in the art that many different programming languages could be used in creating object model 102 without departing from the spirit and scope of the present invention such as Perl or Visual Basic. The languages mentioned above are used in a preferred embodiment for reasons described above.

A unique and innovative method according to an embodiment of the present invention is initiated by using a model-converting writer 103 to write object model 102 into the form of a collection of human readable files. ASCII files. Such files are commonly referred to by those with skill in the art as flat files, and are typically human readable and sensical. A flat file 104 which is an ASCII file containing knowledge base objects that have been converted and written by model-converting writer 103 can be transported to the client over the Internet or another type of network. Flat file 104 is an external media type file that can be read by a computer program or by a person. Therefore the recreation or modification of the object models can be automated or manual. Also, communications across different platforms is sometimes "intransparent", meaning only human readable files can be transferred. Other file types, such as binary files, can contain characters that would be interpreted by either entity (sending or receiving computer) as commands, including such commands that can disrupt or terminate such communications.

Flat file 104 in an embodiment of the invention is used as a source for a GUI builder 111 in the process of building a GUI object model 112. GUI-object model 112 insures that there are graphical or visual representations of the appropriate parts of object model 102. Using a conversion-model writer 113, GUI-object models are written into the form of a human-readable ASCII flat file along with some optional multimedia files for filling in the GUI that can then be sent to a client.

The incorporation of a human readable, ASCII format into the knowledge base process allows for the transporting of the associated information across different computer platforms as well as allowing for the use of differing languages. This unique method utilizes known software applications such as model-converting writers 103, and 113 and enhances them with the capability of converting the object models into flat files as explained and taught above.

In FIG. 1, dotted line 110 represents a network transmission interface, such as transmission of files to a client via an Internet connection. Those steps and processes appearing above line 110 are on the seller's side, and those below are on the client's side. Presumably, in the case of the Internet, the client has accessed the seller's Internet site, and is capable of downloading selected information. Whether or not the information downloaded is useful to the client is an issue addressed by the present invention.

At the client's end, a reader application 123 reads the flat files downloaded from the advertiser's site and rebuilds these files into objects for a knowledge-based configurator known in the art as a run-time engine 121. Run-time engine 121 converts flat files 104 and 114 back into knowledge base objects 122 and GUI objects 132 which are the same as object models 102 and 104. For example, if the same programming language and environment is used in run-time engine 121 as in model builder 101, then knowledge base 122 will be identical to object model 102 both binaurally and descriptively. The same relationship can be concluded with regards to GUI objects 132 and object model 112. If a different language and environment is used in run-time generator 121 than that used in model builder 101, then the files are not binaurally identical, but will accurately describe the same object.

A process of the present invention as described above could be used to up-date configurator systems such as run-time engine 121. Editing or changing rules could be done from within the knowledge base instead of from within the object model via the addition of a reader that reads the flat file back into object model 102.

Method and Apparatus for Remote Client to Knowledge Base Interaction

According to a preferred embodiment of the present invention, a method and apparatus is provided wherein a client may interact with and configure a knowledge base without downloading the knowledge base or software used to manipulate the knowledge base.

Figure 2:
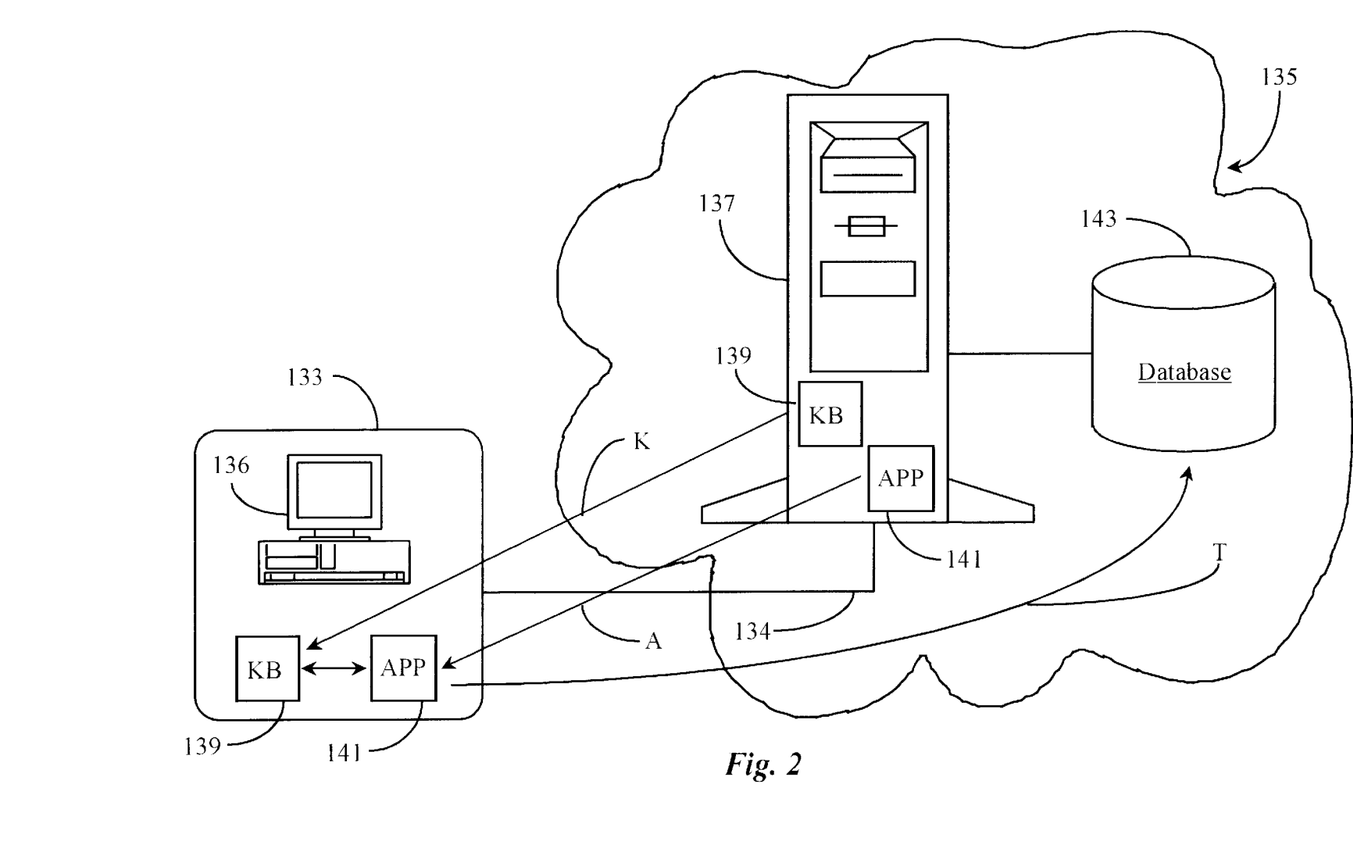
FIG. 2 is a block diagram illustrating system architecture and client interaction with a WEB-based knowledge base according to an embodiment of the invention described in priority document Ser. No. 08/962,594, U.S. Pat. No. 6,049,822.

FIG. 2 is a block diagram illustrating client interaction with a WEB-based knowledge base according to an embodiment of the invention described and claimed in application Ser. No. 08/962,594, U.S. Pat. No. 6,049,822. In order to enable an adequate explanation of the present invention, the inventor has chosen to first illustrate a network topology that is consistent with the priority application listed under the Cross-Reference to Related Documents above.

According to the prior embodiment, a unique method was taught for client interaction with WAN-based knowledge bases that is adapted to save the client time and resources when configuring a product or service for order. The topology as illustrated herein with reference to FIG. 2 comprises a client 133 that is connected to a wide area network (WAN) 135, such as the Internet, via a remote network connection 134, such as a typical Internet connection known in the art. The method of connection may also, in some embodiments, be that of a shared network connection such as may be the case of a smaller local area network (LAN) connected to WAN 135.

WAN 135 may be the Internet, an Intranet, or another type of WAN known in the art. Client 133 has a personal computer (PC) 136 having the capability and equipment to enable the above described connection to WAN 135 as known in the art. WAN 135 comprises a server 137 adapted to serve and receive data to and from PC 136 at the location of client 133. File server 137 is typically hosted by an enterprise engaged in selling products to clients such as 133 over WAN 135, as is consistent with the method taught with respect to the priority application. A database 143 is illustrated as being connected to file server 137 as is known in the art of server/database relationships as practiced on a WAN.

A knowledge base 139 is resident in server 137, or accessible from database 143, along with an applet 141 adapted to manipulate and configure knowledge base 139.

The configuration of knowledge base 139 is defined, for the purpose of clarity, as selecting the desired options relating to color, model number, optional accessories, and the like, as may be offered as interactive options in the knowledge base representing the product.

Knowledge base 139 is analogous to components 104 and 114 as listed above line 110 (seller's end) in FIG. 1 of the priority application. Knowledge base 139 as such is also illustrated logically as downloaded to PC 136 at the location of client 133 as indicated via directional arrow K. At PC 136, knowledge base 139 is analogous to elements 122 (KB Objects) and element 132 (GUI Objects) as illustrated below line 110 (client's side) of FIG. 1.

It will be apparent to one with skill in the art that there may be many more than one knowledge base and associated applet available from server 137 without departing from the spirit and scope of the present invention. However, the inventor chooses to illustrate only one knowledge base and one applet in order to simplify explanation of the present invention.

Applet 141 is analogous to Reader 123 and Run-Time Engine 121 as illustrated below line 110 (client's end) in FIG. 1. Applet 141 is also illustrated as downloaded to PC 136 as was described above with reference to knowledge base 139. The download is illustrated via directional arrow A. In this way, client 133 may configure his product off-line via use of the downloaded components. For example, applet 141 is used as a tool to configure knowledge base 139 as illustrated via bi-directional arrow placed between the two components. Once his product is configured, client 133 may go on-line (connect to WAN 135) and upload a finished order to server 137 which may in turn communicate with database 143 and relay information back to client 133. Database 143 typically contains data related to the products provided by the company presenting the knowledge bases and may also contain additional information such as shipping dates, product status, product updates, applet updates and so on.

Working off-line allows client 133 to configure knowledge base 139 at his leisure and allows him to place an order for the configured product at any desired time. In this case, ASCII files (flat files) along with optional multimedia files as described with reference to FIG. 1 are sent in the download of knowledge base 139 as represented by arrow K. This allows for differences in computer platform and languages to be utilized on the same network-interaction topology. While this unique topology and method provides distinct advantages to client 133, he still must download applet 141 and knowledge base 139 in order to configure and place his order. This could be an issue if he is using someone else's computer, for example, wherein downloading components is not desired or approved by the owner. Similarly, he may be sharing a common system with several users with policy governing the system discouraging or forbidding such purchasing wherein significant downloading is required.

According to a preferred embodiment of the present invention, a unique applet is provided and adapted to function as a controller for manipulating an applet such as applet 141 of FIG. 2 to configure a knowledge base such as knowledge base 139 of FIG. 2. This innovative applet gives a client complete control over the configuration of his product and transaction of his order.

Figure 3:
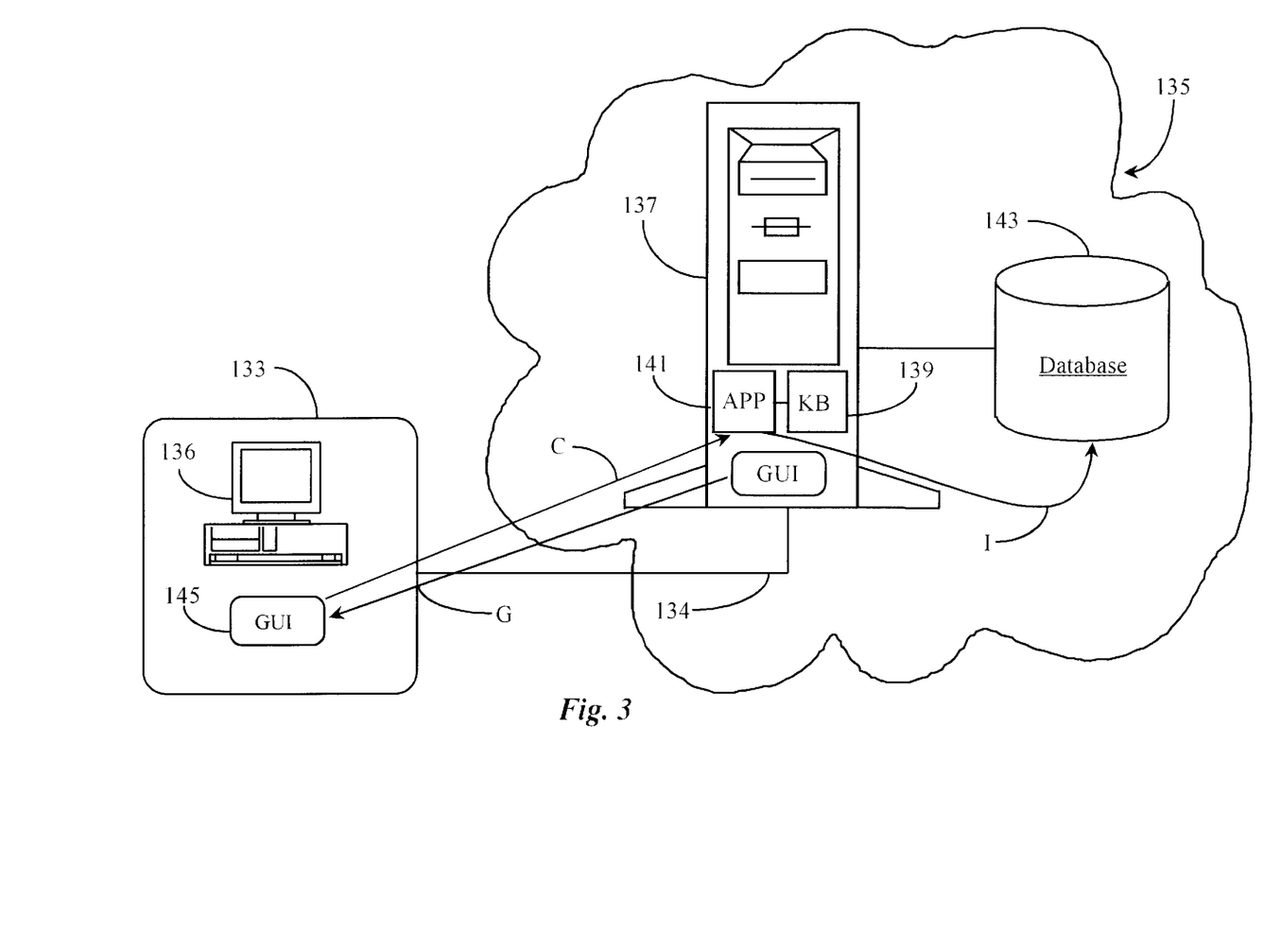
FIG. 3 is a block diagram illustrating client interaction with a WEB-based knowledge base according to an embodiment of the present invention.

FIG. 3 is a block diagram illustrating architecture and client interaction with a WEB-based knowledge base according to an embodiment of the present invention. In order to avoid redundancy elements of topology and components that are not new to the invention will not be reintroduced and retain their same element numbers.

The network topology of FIG. 3 is essentially the same as the network topology illustrated with reference to FIG. 2. For example, client 133 is connected via remote connection 134 to server 137, which in turn is connected to database 143 as was described with reference to FIG. 2. However, a difference exists in the way that the client interacts with knowledge base 139 and applet 141.

A graphical user interface (GUI) applet 145 is provided and adapted to communicate and exert control over applet 141 which in turn enables the configuration of knowledge base 139. GUI 145 is, in this embodiment, a Java-based applet which is capable of being executed on different kinds of platforms. In alternate embodiments, GUI 145 may be COM model, or Active-X™. As a Java GUT, applet 145 is adapted to send and receive data as both text and graphics. Similar to a software control panel, a client such as client 133 uses GUI 145 to instruct applet 141 to make the desired selections required with respect to knowledge base 139 in order for a successful product order to be realized.

In this embodiment, GUI 145 is the only component that must be downloaded to PC 136 as illustrated via directional arrow G representing such download. As a control interface, GUI 145 contains only the appropriate control codes and display capability for required interaction. For example, commands may be sent to applet 141 to execute desired selections, while displayable results of such selections appear in a display window or dialog box associated with GUI 145. This allows GUI 145 to remain very small in overall data size, therefore, largely reducing any download requirements that otherwise may be presented.

GUI 145 may be in the form of a WEB-browser plug-in. As a Java enabled plug-in, GUI 145 may be capable of transmitting and receiving audio, audio/video, text and graphics, or any other supported media. In one embodiment, GUI 145 may be embedded in a WEB form downloaded by client 133 from the company selling the products.

GUI 145 has the ability to communicate with applet 141 as illustrated via directional arrow C. Communication between GUI 145 and applet 141 in server 137 is such that knowledge base options may be viewed, and selections may be made wherein upon making a selection, viewable results of the selection are presented in a GUI-associated display or window. GUI 145 may contain application program interfaces (API's) adapted to invoke installed readers, viewers, players, and such as may be required to disseminate audio or graphic content. In one embodiment, the required or selected viewing capability is supplied with GUI 145.

The unique method of providing a GUI as an interface produces an option wherein a client need not perform any significant downloading in order to configure and present an order to a company. The complete configuration and transaction of an order takes place on-line. Updates to client software are minimized as only GUI updates are required when significant editing is done to an existing GUI. Such updates may be delivered to a client via push technology such as e-mail, or offered to the client in the form of an interactive uHHte button. One example of a GUI uHHte may be that a new media is supported. Code enabling the media may be sent as an executable and configure itself to the existing GUI code.

With the use of GUI 145, a client such as client 133 cannot now configure his product off-line and send an order whenever he decides. However, this disadvantage is substantially off-set by the fact that downloading is at a minimum. In many cases, configuring and ordering a product on-line with GUI 145 will be faster than downloading components that would be required when performing the same task without GUI 145. Of course, this will depend on the size and complication of the downloaded knowledge base and associated controls.

After configuring a knowledge base such as knowledge base 139, GUI 145 may act as an interface to database 143 through applet 141. For example, the actual transaction of the order, confirmation of the receipt of the order and any added information such as real-time status, any conflict information such as might cause delay in shipment, and so on, may be relayed to client 133 via applet 141 and GUI 145.

It will be apparent to one with skill in the art that an applet such as GUI applet 145 may be created supporting varying media types as may be offered in a presentation or product promotion and that such media types may be already installed on PC 136 and invoked by GUI 145, or be provided in their entirety as viewers within GUI 145.

It will also be apparent to one with skill in the art that the use of ASCII files as illustrated with regards to FIG. 1 (P3501PA) may be practiced on the sellers side if more than one computer language or platform is evident among several systems connected to the sellers network. With the provision of GUI 145, a client such as client 133 will not be required to work with ASCII files.

It will be apparent to one with skill in the art that a method of the present invention such as described with reference to FIG. 1 could use a variety of different programming languages as known in the art without departing from the spirit and scope of the present invention. It will also be apparent to one with skill in the art that the method of the present invention may be adapted to be transported across a variety of known computer platforms without departing from the spirit and scope of the present invention. For example a client using a windows operating system may download and configure ASCII files that were generated in a UNIX environment and so on.

Application Program Interface for State-Enabled Amendments to On-Line Services

According to another aspect of the present invention, a method and apparatus is provided that enables a user to enter an on-line sales or service site from a thin client, and to make amendments to (reconfigure) services and orders. Such sites include a very broad range of sales and service organizations. For example, one might configure an order to purchase an automobile from such a site, or any one of many other sorts of products. One might also configure services such as insurance services as well. For example, if a user is a client of a particular insurance broker, that user may have several insurance policies in force (life insurance, medical insurance, automobile insurance, home-owner's insurance, and the like). Such a broker may have an on-line interface allowing a user to configure and reconfigure services on-line.

As was described above, becoming a client to any such service on-line typically means providing a relatively large amount of information to the site, subscribing in a manner that interaction with the site is secure (user name, password, etc.), and configuring orders or services through a relatively sophisticated interface of the sort that is typically provided as a WEB page and accessed by a relatively powerful desktop computer.

Once one has an account with such a site, and has configured services or orders, there exist a broad range of possibilities wherein one might wish to access the site for information or to change the configuration of services or orders, for example. In some cases one might wish to do so using a light client device, such as a cell telephone or a Palm™ device for example. There is no ability to do this in the present art.

There are a number of ways the invention might manifest itself in the art, and it is a goal of this specification to provide enabling disclosure. In a primary example presented below, the invention is described as apparatus and methods enabling a user to make last-minute changes to a pre-configured knowledge-based order for a product without being required to re-configure an entire order. It should be remembered that the same apparatus and method may also be used to make changes in configuration to essentially any order or configuration of services offered through a network interface based on a knowledge-base system.

Figure 4:
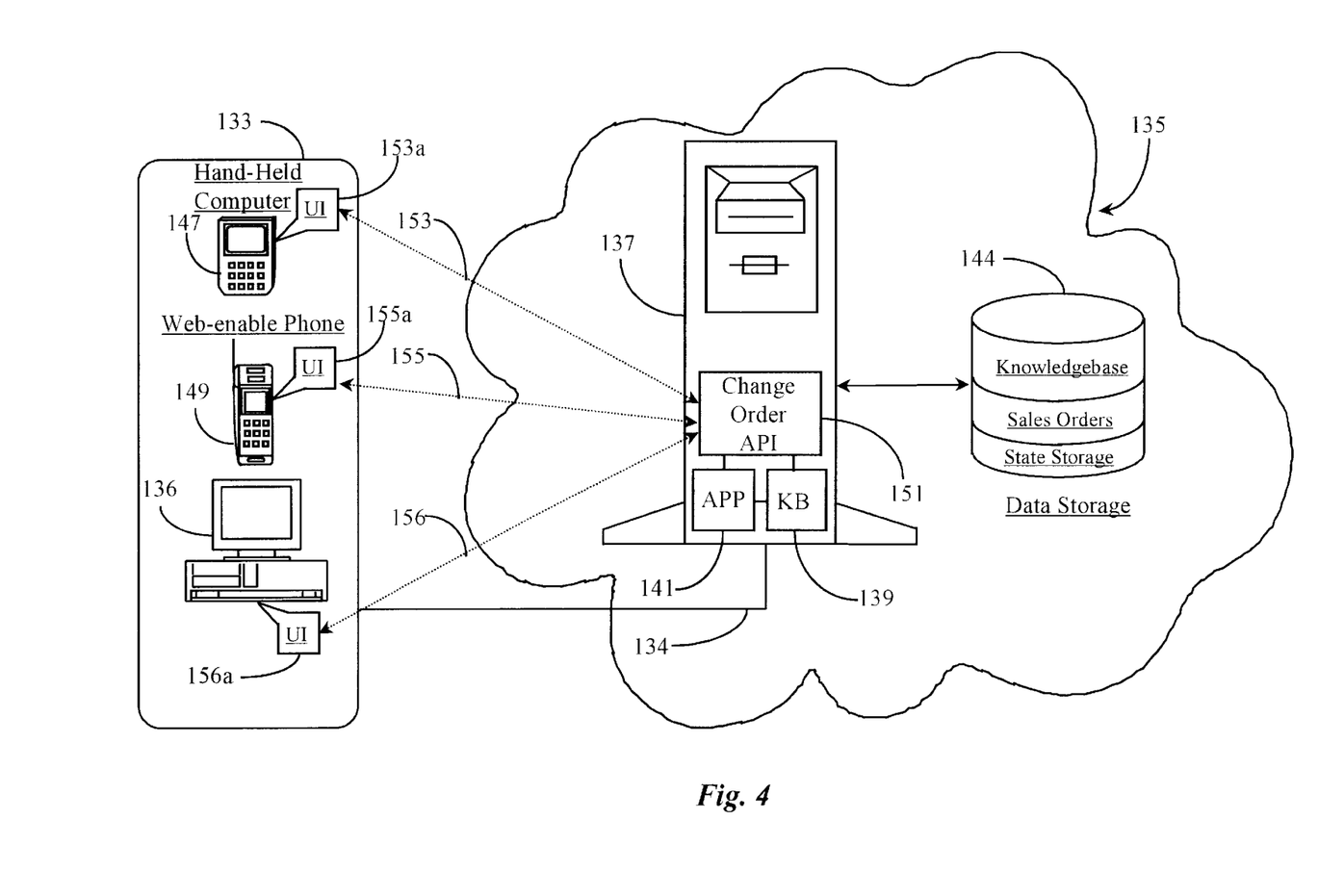
FIG. 4 is a block diagram illustrating client interaction with a WEB-based knowledge base for changing an order according to an embodiment of the present invention

FIG. 4 is a block diagram illustrating client interaction with a WEB-based knowledge-base system for changing an order, according to an embodiment of the present invention. Many of the same components represented in FIG. 3 above are also used in this example. Therefore elements of topology and components that are not new to this example will not be reintroduced and retain their original element numbers from FIG. 3. For example, client 133 of FIG. 3 is connected via Internet-access line 134 to server 137, which in turn is connected to database 143 in FIG. 3. The only difference in this exemplary connection topology is that the equivalent of database 143 illustrated in FIG. 4 is sectored for separate classifications of data storage, and therefore has a new element number (144) assigned. Also in this case Web server 137 hosts the functionality of applet 141 and knowledgebase (KB) 139 from FIG. 3.

Client 133, in this example, is illustrated as having access to additional communications devices labeled herein as a Hand-Held (HH) computer 147, and a Web-enabled phone 149, in addition to a PC/VDU 136. HH 147 and phone 149 are presumed in this example to be owned and operated by a same user operating PC 136. HH 147 and Web phone 149 are also presumed to be standalone Internet-capable appliances capable of dialing an Internet-service-provider (ISP not shown) and logging on to a data-packet-network (DPN), which in this example is Internet 135. A good example of HH 147 would be that of a Palm™-class computer. In one embodiment of the present invention, a peripheral access device such as a personal digital assistant (PDA) may also be used in practice of the present invention. However, in a preferred embodiment, additional devices 147 and 149 are independently capable of network (Internet) access.

Network access methods used for accessing network 135 from client 133 using devices 147, 149, and 136 are not specifically detailed in the example because they are well-known in the art. The most common technique is dial-up modem technology through an ISP. Wired or wireless methods may be used, such as Wireless-Access-Protocol (WAP) telephony and other wireless digital networks. Exact network connection architectures are not illustrated in this example, but may be assumed to be present and appropriate for each of the devices illustrated. Likewise, there may be more types of network-capable devices provided to client 133 than are illustrated in the example. The inventor chooses to illustrate 2 such devices additionally to PC 136 and deems them sufficient for the purpose of explanation of the invention.

Dotted double-arrowed lines 153, 155, and 156 illustrated generally between each device within the domain of client 133 and Web server 137 are intended to represent logical communication links more specifically described as illustrated between provided user-interface applications (UI) 153a on device 147, 155a on device 149, and 156a on device 136 and a provided instance of a Change Order Application Program Interface (API) 151 executing on server 137. The described links illustrate communication between the mentioned software instances. More detail about the function of the described software instances is provided later in this specification.

In this embodiment there exists a difference in method in the way that client 133 interacts with KB 139 and applet 141 from illustrated devices 147, 149, and 136. In addition to an ability of accessing Web server 137 from PC 136, client 133 can also access server 137 from either HH 147 or web-enabled phone 149.

API 151, in one embodiment, sends UI 153a–156a to requesting devices in the event that one of the associated devices 147–136 is used to log on to server 137. Each UI 156a, 153a, and 155a is configured dynamically to the capabilities and bandwidth requirements of each respective communication device (147, 149, and 136) to which it is sent. The purpose of UIs 153a–156a is to facilitate client 133 in the function of initiating a change (through API 151) to any pre-configured knowledgebase order that client 133 may have in place at server 137. In this preferred embodiment API 151 is provided for the purpose of interfacing between a client utilizing any one of devices 147, 149 or 136 and knowledgebase order configuration utilities exemplified herein by APP 141 and KB 139. UIs 153a, 155a, and 156a are provided as client-side tools to enable successful interface according to device platform and other parameters such as input capability and bandwidth capability.

It is noted herein that UI 156a, in the case of PC 136, may be enhanced as a GUI as described with reference to FIG. 3 because of sufficient bandwidth and capabilities inherent to a PC. However, UI 156a is, in a preferred embodiment, used as a communication interface to API 151 even during configuration of an original order for reasons that are provided further below.

As previously described above, change orders may represent impulse or last-minute changes to pre-configured knowledgebase orders. Database 144 is separated or sectored providing a section for storing knowledgebase rules and constraints labeled herein as Knowledgebase, a section for storing sales orders labeled Sales Orders, and a section for storing order summary states labeled State Storage. The redundance of a Knowledgebase in data storage 144 and KB 139 in server 137 is to illustrate that a KB may be maintained in either location, or even elsewhere, as long as App 141 has access. Further, there may be more than a single KB for different purposes maintained in an accessible location.

Order summaries (or service configurations) and additional information are stored in the portion labeled State Storage, which allows access to at least a summary of an original order pre-configured by a user operating from client domain 133. The use of the word summary in this embodiment means that high bandwidth and memory-dependant aspects of an original knowledgebase order are not present in a summary of such an order. Once an order summary is accessed and delivered to a user through API 151 and one of the appropriate UIs 153a–156a, the user can quickly navigate to specific portions of the order needing to be changed without having to fill out or walk through a complete order from beginning to end using PC 136. Further, the user can start from any point in the summary order; that is, there is no fixed or pre-defined application flow.

FIGS. 7a through 7c illustrate a specific example of the use of State Storage and an order Summary in an embodiment of the present invention. FIG. 7a shows, in a much abbreviated fashion, all of the choices that might be made in configuring an order for an automobile. There are three different selections in Model, four in Color, and four options packages. The inter-relationships are not shown in FIG. 7a, but may be assumed to exist. That is, some colors may be available in all series, while other colors may be available in only one or a few of the series, and so forth.

In configuring an initial order from a desktop computer, as shown in FIG. 7b, a user is restricted to begin by selecting a model, then a color, and finally an option package. The available selections will change as previous selections are made. At the end of this process an order is configured, and may be saved. The order then shows 7 Series, Silver, and Sports package option.

When a user later accesses by telephone with a display (for example-could be by other light appliance) he/she will see a display like the one shown in FIG. 7c. This display is provided to the phone or other light device using the State Storage ability of the present invention, having a Summary order, and the user may navigate directly to any one of the horizontal positions. In this case the user has decided to change the color. When he/she selects the Color box a drop-down menu or other selection mechanism provides selectability for any other colors that are selectable, given the present order configuration. In this example the user selects Black, and the display changes to show the selection verified. The system automatically verifies that 7 Series and Sports Option are compatible with color Black. The system automatically appends 7 Series and Sports option to color Black, and then generates a new order configuration and saves it.

In this exemplary embodiment server 137 has API 151, applet 141 and knowledgebase (KB) 139, but not GUI 145 of FIG. 3. This is because it may be assumed that UI 156a has the appropriate graphics capabilities available to a device (PC 136) having sufficient processing power and communication bandwidth capabilities for direct interface with APP 141 and KB 139 in configuring an original order.

In general process method relating to practice of the invention in this example, a user first configures an order using PC 136 by logging onto server 137 through access line 134 using typical network connection technology. Once logged in and authenticated if required, server 137 sends UI 156a to PC 136. In one embodiment, PC 136 may already have UI 156a installed before login. In the case of PC 136, UI 156a has all of the required capability for enabling a user operating PC 136 to configure an entire knowledgebase order with robust graphics capability as well. API 151 monitors user configuration of a knowledgebase order by acting as an interface placed between PC 136 and APP 141 and KB 139. A new order is completed using APP 141 and KB 139 using the rules and constraints provided in the Knowledgebase. The Sales Order section of database 144 provides, in this example, a storage for completed orders. API 151 provides the appropriate form and format for generating an original order through UI 156a. The sales order portion of data storage contains the finished orders usable to sales, manufacturing, service personnel and the like. Once an original order is completed by a user through PC 136, a summary (scaled down) version of the original order is stored in the State Storage section of database 144, along with certain other information, which may include such as historical data regarding order placement, the order in which selections were made, choices rejected by a user, remaining choices that can be made based on present configuration, constraints satisfied, constraints failed, and certain other data that may differ in different embodiments of the invention. This state storage process presents users with an ability to make further changes to the basic order, using if desired a thin client device, based on changing personal preferences or later needs or information. With this capability, a user operating from the domain of client 133 may now make changes via any one of Internet appliances 136, 149, or 147 configured respectively with UI 156a, 155a, or 153a by interfacing solely with summary elements and state information of the original order stored in State Storage. API 151 provides the required functionality for initiating and implementing a change order.

To change an existing order or service configuration a user simply logs into server 137 from one of devices 136, 149 or 147 and receives an appropriate instance of UI 156a, 155a, or 153a respectively after login and authentication if required. A user need not reconfigure a complete order but may now change only those items which represent changeable options. If for example, a user accesses server 137 using device 149 (web phone), UI 155a will enable the process to operate on the specific device. A scaled-down version of an order stored in State Storage is accessed and delivered to phone 149 and contains all of the user's original choices and any current change options available.

Using UI 155a, a user may navigate directly to the item of the order that he or she wishes to change and input the desired changes. In this way, much input activity is eliminated when compared to re-configuring an entire order from scratch. After a user enters the desired change or changes, the change-order is submitted to server 137. API 151 then takes the change order request and utilizes APP 141 and KB 139 to reconfigure a new order using the rules and constraints in the knowledgebase. If during configuration of the new order an error occurs with regard to a conflict in constraint or rule, a message containing the details and the original summary order version is delivered back to a user during the same session. If the change order is successful, meaning that the changes can be registered without conflicting with unchanged portions of the order, then a new order resulting from the change replaces the old order in the sales order section of database 144 and a new order summary, and perhaps additional state data is stored in state storage in place of the previous data.

Figure 5:
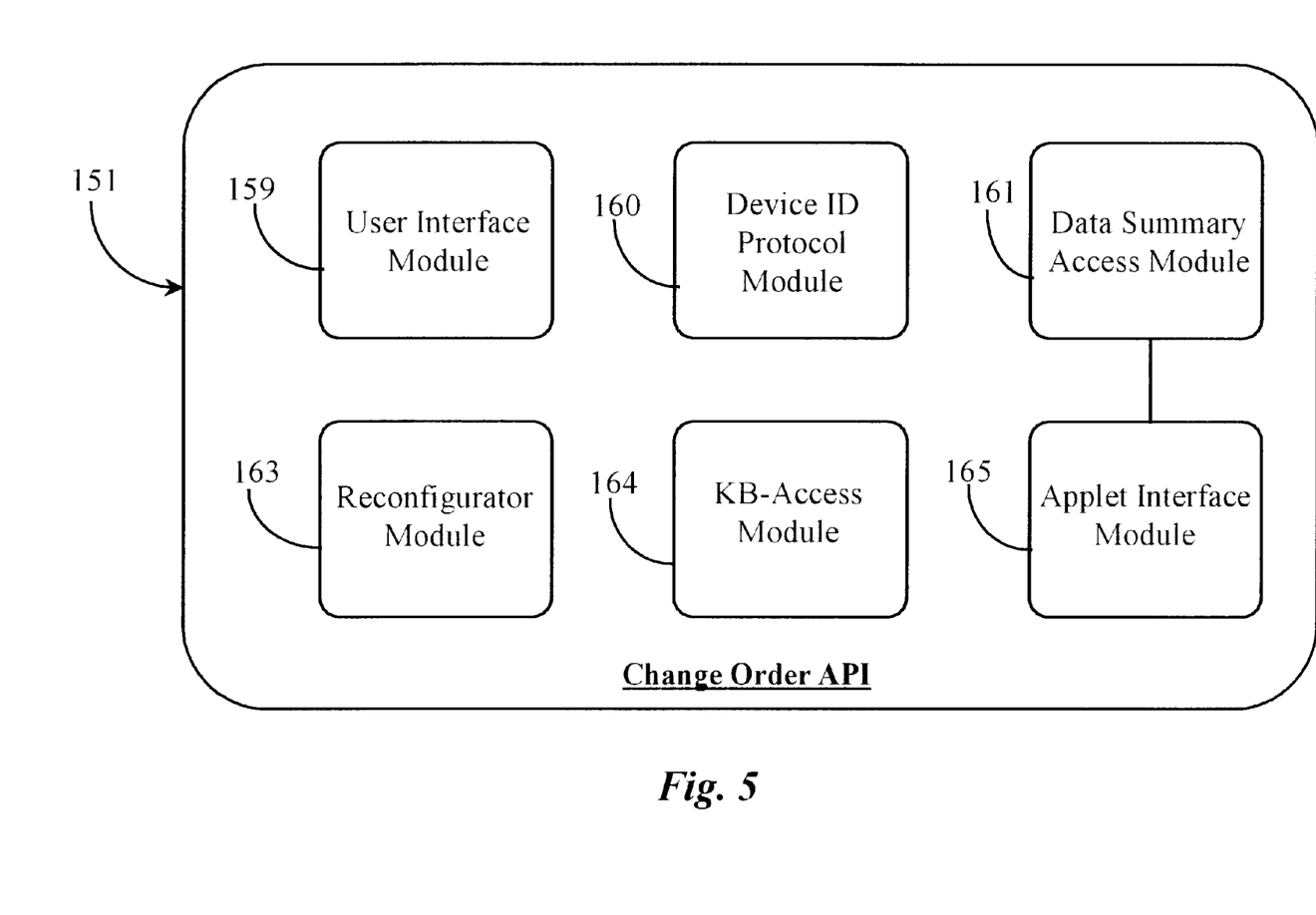
FIG. 5 is a block diagram illustrating various modules of a change-order API according to an embodiment of the present invention.

FIG. 5 is a block diagram illustrating various modules of a change-order API 151 according to one preferred embodiment of the present invention. A user Interface Module 159 is provided within API 151 and is adapted to provide any necessary functionality in cooperation with server software installed on server 137 (FIG. 4) for interface with a particular accessing device and to send the appropriate UI to the accessing appliance when a user accesses the web server to make a change order. User interface module 159 is adapted to recognize the needs of specific platform types and input capabilities, such as scrolling function, display limitations and the like, including bandwidth variations of differing access devices. A device ID Protocol Module 160 is provided within API 151 and adapted to work in conjunction with module 159 for identifying and authenticating users and devices.

In one embodiment, modules 159 and 160 may be provided as one single module. The inventor chooses to separate user interface functions from actual device ID and authentication, which can be confirmed transparently to users. In some embodiments, authentication also includes authenticating users by password, code, username, or a combination thereof.

It is important to note herein that some of the functionality of modules 159 and 160 may be provided by standard server software in an alternative embodiment. Once a user has been identified and authenticated, the appropriate UI analogous to UIs described with reference to FIG. 4 is delivered to the requesting user, if the authentication did not determine that the device already is enhanced with the appropriate UI. A UI delivered after authentication may contain a summary version of the user's original KB order. The summary version is interactive, of course, enabling the receiving user to make changes using the receiving device.

A Data Summary Access Module 161 is provided within API 151 and adapted to access the Sate Storage section of a connected database analogous to database 144 and the State Storage described with reference to FIG. 4. Module 161 operates in sync with modules 159 and 160 such that a summary version of an original order is delivered with the appropriate UI upon authentication.

In one embodiment, the appropriate UI may be already resident on a requesting device and only the summary order version of a target KB order is delivered. In the event that a user has more than one KB order in progress and wishes to modify only one of the orders, then such communication and confirmation takes place before module 161 performs it's function. It is also noted herein that normal server-to-client interaction may determine whether or not a user actually wishes to change an order before module 161 is activated.

A user may manipulate the summary version of a KB order through the appropriate input capability generic to the requesting device. For example, the end user may be using a telephone device 149 (FIG. 4), in which case selectable options will be caused to appear in a display of the particular telephone device in a manner that will make selection and other interaction as intuitive as practical. The summary order contains all of the original selection fields of the original order and all of the current options still available. A scaled down version of an original KB order may be presented as a series of scrollable text-based pages presented in a format acceptable to and usable on the requesting device. An index may be provided that lists all of the available order pages. The index may be interactive such that by selecting, for example page 5, the user may immediately navigate to page 5. Order fields then presented on page 5 can then be changed according to available option. In this way, a user does not have to expend data-input resources required to confirm all of the selections (pages 1–4) up to page 5.

Once the new summary version of the order is modified and submitted, API 151 acts to re-configure the original order by proxy on behalf of the requesting user. A KB-Access Module 164 is provided within API 151 and adapted to enable access to KB 139 of FIG. 4. An Applet Interface Module 165 is provided within API 151 and is adapted to enable access to APP 141 of FIG. 4. A Reconfiguration Module 163 is provided within API 151 and adapted to work in conjunction with modules 164 and 165 to effect total reconfiguration processing of a new order according to the submitted changes exchanged between server and client as taught above.

In one embodiment, module 163 is optional and not required. In this case, the same configuration engine described with reference to APP 141 of FIG. 2 and FIG. 3 may be interfaced directly through module 165. However, some KB order fields need not be re-configured during a change order process such as constant information generic to all orders. Therefore, module 163 is provided for configuring only KB fields subject to rules and constraints that may change according to modification efforts either directly or indirectly. For example, a user's name and address is not likely to change in a modification. In one embodiment, module 163 may be selected in place of a configuration engine generic to APP 141 if there is benefit in doing so.

This example assumes that APP 141 and KB 139 are essentially unchanged from described functions with reference to FIG. 3. API 151 simply provides interface capability for proxy execution of the functions provided by APP 141 and KB 139.

It will be apparent to one with skill in the art that the modules illustrated within API 151 may vary both in number and in function according to various embodiments without departing from the spirit and scope of the present invention. For example the functions of APP 141 and KB 139 may be absorbed by API 151 through addition of the appropriate modules of those conventions. API 151 and the functional modules illustrated therein represent only one possible software implementation that enables a user to initiate a change order to a pre-configured KB order without requiring the user to participate in order reconfiguration. Order reconfiguration and acceptance of a new order is performed completely by proxy based on a user's submitted change request.

Figure 6:
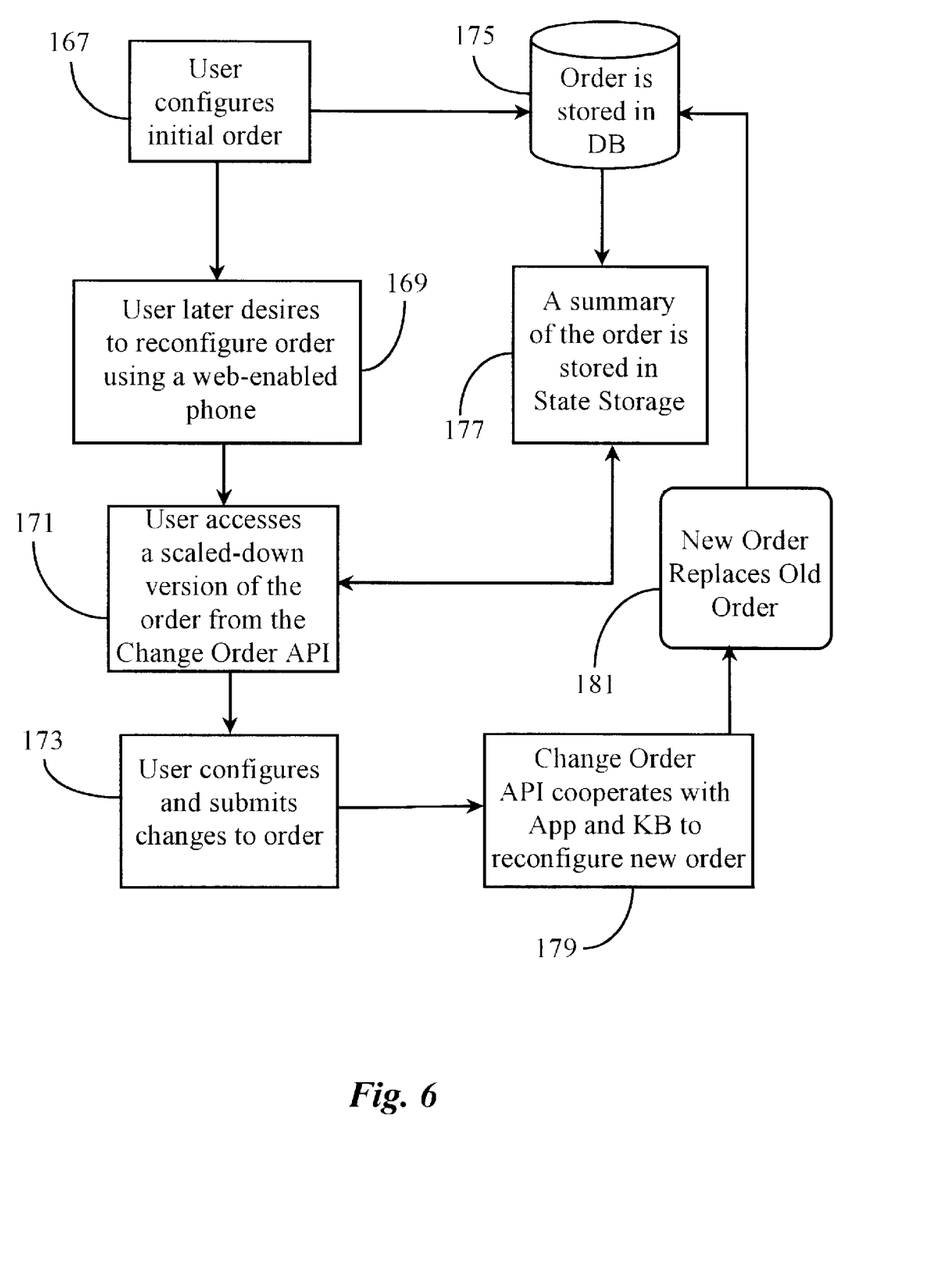
FIG. 6 is a flow chart illustrating a method for configuring and submitting an original order and then changing the order using a web-enabled phone according to an embodiment of the present invention.

FIG. 6 is an exemplary process flow diagram for configuring and submitting an original knowledgebase order including initiating a change order thereafter from a lower-bandwidth device (light client) and having the order reconfigured at the service and stored for the user in place of the original order. The initial steps in this sequence represent a user configuring an initial KB order. At step 167, a user configures an original knowledge-based order. This is accomplished typically using a relatively high-bandwidth device having sufficient processing power, such as a personal computer analogous to PC 136 of FIG. 4. In configuring an original order, robust graphics may be displayed and, in some cases, also be adapted for use as display input mechanisms requiring appropriate processing power and bandwidth capabilities.

At step 175, a completed and submitted KB order is accepted and stored in suitable data storage analogous to database 144 of FIG. 4. The order is stored as a sales order accessible to appropriate personnel charged with filling the order. At step 177, a summary of the order representing a scaled-down version of the original order is stored in State Storage within database 144 as described with reference to FIG. 4, along with certain further data previously described. It is important to note here that an original KB order can typically (but not always) only be configured using an Internet appliance capable of the processing and bandwidth requirements such as PC 136 described with reference to FIG. 4. In the summary order, bandwidth intensive graphics and other memory intensive conventions are removed leaving only typically text fields that are populated with order data and any blank fields still available as options.

The ensuing activity beginning essentially at step 171 may be accomplished via a low-bandwidth device analogous hand-held 147 or web-enabled phone 149 as described with reference to FIG. 4. At step 169 a user later (after first configuring an order or service) desires to reconfigure the original order or service from a low bandwidth device, in this case, a web-enabled phone. At step 171, the user of step 169 accesses a scaled-down version of the order via interface with API 151 described with reference to FIG. 5. In doing so the user has access to all fields of the original order that are capable of being entered or modified by the specific device being used. The order summary is accessed from State Storage as witnessed by a double arrow illustrating bi-directional communication illustrated between steps 171 and 177.

At step 173, the user of step 171 configures and submits any modifications to an existing order or service working from within a provided interface analogous to, in this case UI 155a executing on web phone 149 of FIG. 4. In initiating and submitting a change order the user may specify a parameter or option that conflicts with or voids criteria allowed for the product as identified through consultation with knowledgebase rules and constraints. In this case, the user is notified during the same session before actual implementation of the change order at server-side. In one embodiment notification to a user of user modifications that cause one or more other options to be modified in an original order can only be accomplished through submission of the changes (step 173) and reconfiguration at server-side (step 179). Such a notification is part of an error reporting process that may further instruct a user which options may be changed without causing conflicts.

According to another embodiment a scaled-down summary interface may include instructions as to what selection modifications, additions, or deletions may be accomplished without causing conflict, and what selection modifications, additions, or deletions will cause rules or constraint conflicts upon submission. In step 173 then, the user of step 171 accomplishes the desired changes and submits the changes to the original order of step 167.

At step 179, Change Order API (151) cooperates with App 141 and KB 139 described with reference to FIG. 4 and reconfigures a complete new order, the new order containing the changes submitted by the user.

At step 181, a new order configured at server-side replaces an old order previously configured. The new order of step 181 is stored in the database of step 175 as illustrated by a directional arrow emanating from step 181 and progressing to step 175. Likewise, a new summary order is stored in State Storage replacing the old summary version, along with an update of any historical or other data needed. A primary benefit of this process is that order changes can be made with fewer actions on the behalf of the user, and can be accomplished with alacrity using light client devices. By accessing only those fields necessary to effect the change and bypassing already-populated fields, a new and completely reconfigured order can be made by proxy on behalf of a user operating high or low bandwidth Internet capable devices.

An additional benefit of the described system enables a user with a low bandwidth device to change an original order at the moment that a change in preference or needs occurs. Such an example might be the configuring and submitting of an order for an automobile wherein the user later passes the agency even after it has closed for the day and notices that a selected option or feature is no longer appealing. By use of a cell phone or other device the user can access the service from his instant location and make the desired changes on the spot. Generally this would entail 4 to 6 clicks or selections using a low bandwidth Internet device to effect the modification whereas upwards of 15 to 20 such actions would be required to reconfigure the order conventionally from a PC.

The just-described numbers of clicks required is approximate only. The exact measure of input resource used to configure an original order and the lesser input resources required to modify an order will depend on several variables such as the complexity of the original order configuration, the type of device used to modify the order, the number of modifications desired, and so on.

It will be apparent to one with skill in the art that the method and apparatus of the present invention such as described with reference to FIGS. 4, 5 and 6 is not limited to sales of physical products or consumables and could be implemented with much benefit in a multiplicity of types of sales. The present invention could be implemented for insurance services, leasing services, rental services, and so on. Such services lend themselves more to changing needs than do physical consumables. It will also be apparent to one with skill in the art that the method of the present invention may be adapted to work across a variety of known computer platforms, Internet capable devices, and server configurations without departing from the spirit and scope of the present invention.

It will also be apparent to one with skill in the art that the embodiments described herein are exemplary, and that there may be considerable alterations in the embodiments described while not deviating from the spirit and scope of the present invention. The present invention may be implemented in a variety of network-connection architectures supporting a number of differing embodiments, some of which have already been described. The spirit and scope of the present invention is limited only by the claims that follow.

What is claimed is:

1. A change and update system for existing orders in a network-based knowledgebase (KB) sales and service facility, comprising:
   a user interface (UI) system executing on a client-side communication device for accessing the facility over the network;
   software at the facility for negotiating with the user interface; and
   a state component at the facility storing state data for the existing order at the facility, the state data including a summary of the order and information regarding allowable alterations and effects of alterations;
   characterized in that a user communicates through the user interface with the software at the facility, which negotiates changes to the existing order using data from the state component, and the software, as a result of the negotiation, updates the existing order at the facility with the negotiated changes, and further characterized in that the client-side user interface (UI) system contains only the appropriate control codes and display capabilities required for interaction with the facility for changing and updating the existing order at the facility.

2. The system of claim 1 wherein the network is the Internet network.

3. The system of claim 1 wherein the user interface operates on a light client and the software at the facility comprises an application interface (AI) enabled to recognize the light client, and to transmit selectable options to the user interface based on the characteristics of the light client.

4. The system of claim 3 wherein the light client is one of a hand-held computer, a telephone device, or a personal digital assistant (PDA).

5. The system of claim 3 wherein, upon access by a light client, the software at the facility determines if the client has a usable UI, and if not, transmits UI software to the client prior to the negotiation.

6. The system of claim 1 wherein the facility is dedicated to product sales.

7. The system of claim 1 wherein the facility is dedicated to one or more services.

8. A software suite for network-based knowledgebase (KB) sales and service facilities, comprising:
   a first component storing at least a summary of an original configuration for a product or service; and
   a second component for interfacing with a user interface (UI) executing on a client device;
   characterized in that the second component negotiates with the first component using input from the client device to effect a change in the configuration, and further characterized in that the user interface (UI) contains only the appropriate control codes and display capabilities required for interaction with the second component for changing and updating a configured order at the facility.

9. The software suite of claim 8 wherein the network is the Internet network.

10. The software suite of claim 8 further comprising a third component for using the negotiated change to update the configuration.

11. The software suite of claim 8 wherein the client device is a light client and the second component comprises a facility for recognizing the client and communicating information to the client based on characteristics of the client.

12. The software of claim 11 wherein the light client is one of a hand-held computer, a telephone device, or a personal digital assistant (PDA), and the second component provides compatible information for the particular device.

13. The software of claim 11 wherein, upon access by a light client, the second component determines if the client has a usable UI, and if not, transmits UI software to the client prior to the negotiation.

14. The software of claim 8 dedicated to product configuration and change.

15. The software of claim 8 dedicated to service configuration and change.

16. The software suite of claim 8 wherein the second component additionally stores information regarding allowable alterations and effects of alterations, and the additional information is used in negotiating changes.

17. A method for effecting changes and updates for product and service configurations at a network-based knowledgebase (KB) sales and service facility, comprising the steps of:
   (a) storing at least a summary of a configuration separate from the configuration, in a state storage component;
   (b) communicating with a user interface (UI) applet executing on a client device for update data to effect a change in a configuration at the sales and service facility; and
   (c) negotiating the change with the state storage facility.

18. The method of claim 17 wherein the network is the Internet network.

19. The method of claim 17 wherein the client device is a light client and in step (b) the nature of the light client is determined, and the communication with the light client is conducted to be compatible with characteristics of the light client.

20. The method of claim 19 wherein the light client is one of a hand-held computer, a telephone device, or a personal digital assistant (PDA).

21. The method of claim 19 wherein, upon access by a light client, the software at the facility determines if the client has a usable user interface software (UI), and if not, transmits UI software to the client prior to negotiation.

* * * * *